United States Patent

Krause

[15] 3,643,889

[45] Feb. 22, 1972

[54] AUTOMATIC TAPE-THREADING SYSTEM AND APPARATUS

[72] Inventor: Konrad A. Krause, 870 East El Camino Real, Mountain View, Calif.

[22] Filed: July 22, 1969

[21] Appl. No.: 843,452

[52] U.S. Cl. ................................242/182, 226/95, 242/186, 242/195

[51] Int. Cl. ....................................G11b 15/58, G11b 15/66

[58] Field of Search ..................242/195, 182, 201, 183, 202, 242/184, 203, 204, 185, 205, 186, 206, 188, 207, 189, 208, 209, 210; 352/157, 158; 226/91, 92, 95, 97

[56] References Cited

UNITED STATES PATENTS

| | | | |
|---|---|---|---|
| 2,891,736 | 6/1959 | Blaes | 242/192 |
| 3,127,120 | 3/1964 | Selsted et al. | 226/97 X |
| 3,195,825 | 7/1965 | Louzil | 242/195 |
| 3,414,269 | 12/1968 | Appel | 242/195 X |

*Primary Examiner*—George F. Mautz
*Attorney*—Gregg and Hendricson

[57] ABSTRACT

A threading system and apparatus for automatically threading flexible tape such as magnetic recording tape through a tape device by a travelling carriage physically gripping a free tape end at a supply location and moving it along a tape traverse path for release at a takeup position. The tape requires no end connector and the free tape end is automatically located and gripped without prepositioning.

12 Claims, 11 Drawing Figures

INVENTOR
KONRAD A. KRAUSE
BY Gregg & Hendricson
ATTORNEYS

INVENTOR
KONRAD A. KRAUSE
BY Gregg & Henderson
ATTORNEYS

INVENTOR
KONRAD A. KRAUSE
BY Gregg & Henderson
ATTORNEYS

AUTOMATIC TAPE-THREADING SYSTEM AND APPARATUS

BACKGROUND OF INVENTION

A wide variety of tape and film devices have been developed, ranging from motion picture apparatus to magnetic and thermoplastic tape recorder/reproducer apparatus. The terms "tape" and "tape recorder/reproducer" are herein employed to include any type of flexible tape or film and apparatus employing same. The term "tape transport" is also employed herein to define devices moving tape and the mechanisms thereof.

Tape recorders and reproducers, conventionally incorporate either a supply reel or cartridge upon which tape is originally wound, a takeup reel or cartridge upon which it is wound during recording or reproduction, and a variety of different tape heads, capstans, rollers, tensioning means and the like located along a tape path between these reels. In the field of magnetic tape apparatus, for example, it has been conventional to require an operator to physically grip the free end of tape at a supply reel and manually thread the tape through various rollers and the like across recording, playback and erase threads and thence to physically attach the tape end to the takeup reel, to insure that the tape follows the proper path through the mechanism of the device for utilization therein. Not only is this operation time consuming, but also it poses difficulties to those untrained in the necessary manual manipulations. Additionally, handling of the tape may result in damage thereto.

In order to overcome the above-noted and other difficulties of tape threading there have been developed a variety of automatic tape threaders for use with magnetic tape apparatus. An early approach to automatic tape-threading provided for the attachment of a connector or the like to the free end of the tape upon a supply reel so that this connector could then be physically engaged to draw the tape along the desired tape path and hook the connector to the takeup reel. Examples of this type of system are to be found, for example, in U.S. Pat. Nos. 2,891,736; 3,154,236 and 3,195,792. While it is recognized that this type of automatic threading provides a material advancement over manual threading it is also to be appreciated that the attachment of "catching means" or the like at the end of tape incorporates certain structural limitations and difficulties of its own. Consequently, alternative approaches to the problem of automatic threading have been considered and a pneumatic threading system is shown, for example, in U.S. Pat. No. 3,393,878 in which air jets are utilized for initial tape transport and vacuum is employed to grip the tape at the takeup reel. Various earlier developments had been made in connection with vacuum gripping of tape, primarily related to tape drive rather than tape threading, and the above-noted patent is similar thereto to the extent of employing a vacuum at the hub of the takeup reel for securing tape to the reel.

While it will be appreciated that various improvements in automatic threading of tape through tape recorder/reproducer devices have been made, there yet remain various problems in the field thereof. The present invention is particularly directed to a solution of these problems and to the provision of simplifying apparatus for automatic tape threading in a tape recorder/reproducer.

SUMMARY OF INVENTION

The present invention provides for the automatic threading of flexible tape or film, for example, along the path of such tape through a device adapted to operate thereupon. The foregoing utilization of a movable carriage or trolley following the path of tape and generally displaced therefrom so as to automatically engage or grip a free end of a roll of tape that may be wound upon a supply reel and, upon a control or command signal, move such tape through a normal tape path of a device adapted to operate upon the tape and thence to attach this tape to a takeup reel whereupon the tape is released as fully threaded in the device. The invention is applicable for use with either reels, cartridges or bins and in the following description of the invention the term "reel" is herein taken to cover each of these alternatives.

A relatively wide range of alternatives and variations in the present invention are possible; however, one preferred embodiment of the invention includes means for moving radially inward of a supply reel of a tape recorder/reproducer to physically capture or grip a free end of tape upon a supply reel. Such free end of the tape is automatically located and is then moved under control of a carriage or the like through the normal path of tape in the device and is thence moved radially inward of a takeup reel whereat the tape is gripped by the reel and released by the carriage which moves out of the tape path so that the conventional tape transport is possible.

One preferred embodiment of the present invention employs a vacuum system by means of which the free end of tape upon a supply reel is withdrawn from the reel through suction applied by a pivotally mounted arm engaging tape on such reel. The arm and carriage are moved by a command signal generated by a vacuum sensor to thread the tape across the various heads of a tape recorder/reproducer into such position that the aforesaid arm moves radially inward of a takeup reel to engage the hub thereof which is also provided with apertures through which a vacuum is drawn in order to at least initially secure the tape end to the hub.

A variety of alternative embodiments of the present invention are possible but all operate to achieve automatic tape-threading through a tape recorder/reproducer without the necessity of tape gripping means on the free end of tape on a supply reel and, furthermore, employing a travelling carriage, trolley or the like, which physically grips a free end of tape and positively positions such end upon the takeup reel. Tape is threaded along the desired path thereof whether it be straight, curved, multilevel or other. One of the features of the present invention is the provision of means for properly positioning the free end of tape from a supply reel at the hub of a takeup reel, for it is at this position that the takeup reel is capable of gripping the free end of tape and initiating winding of same through the tape path of the tape recorder/reproducer apparatus. This positioning is preferably accomplished in accordance with the present invention by one or more pivotally mounted members but may be alternatively accomplished by the utilization of a particular type of takeup reel accommodating alternative carriage means.

In addition to the foregoing, the present invention, at least in various embodiments thereof, provides for automatically picking up or engaging the free end of magnetic tape upon a supply reel without the necessity of any human intervention or prepositioning, and it will be appreciated that this then calls for some radially movable means or influence not only capable of engaging the end of tape upon such reel, but also preventing uncontrolled unwinding of such tape during rotation of the supply reel. The foregoing automatic pickup of the free end of tape upon a supply reel may be accomplished by initial rotation of the supply reel in an opposite direction to that normally employed during operation of the tape recorder/reproducer. This automatic tape end sensing and gripping commends the invention to automated reel or cartridge selection as from storage and automated reel or cartridge loading.

DESCRIPTION OF FIGURES

The present invention is illustrated as to preferred embodiments thereof in the accompanying drawings, wherein.

DESCRIPTION OF PREFERRED EMBODIMENTS

Figure 1:
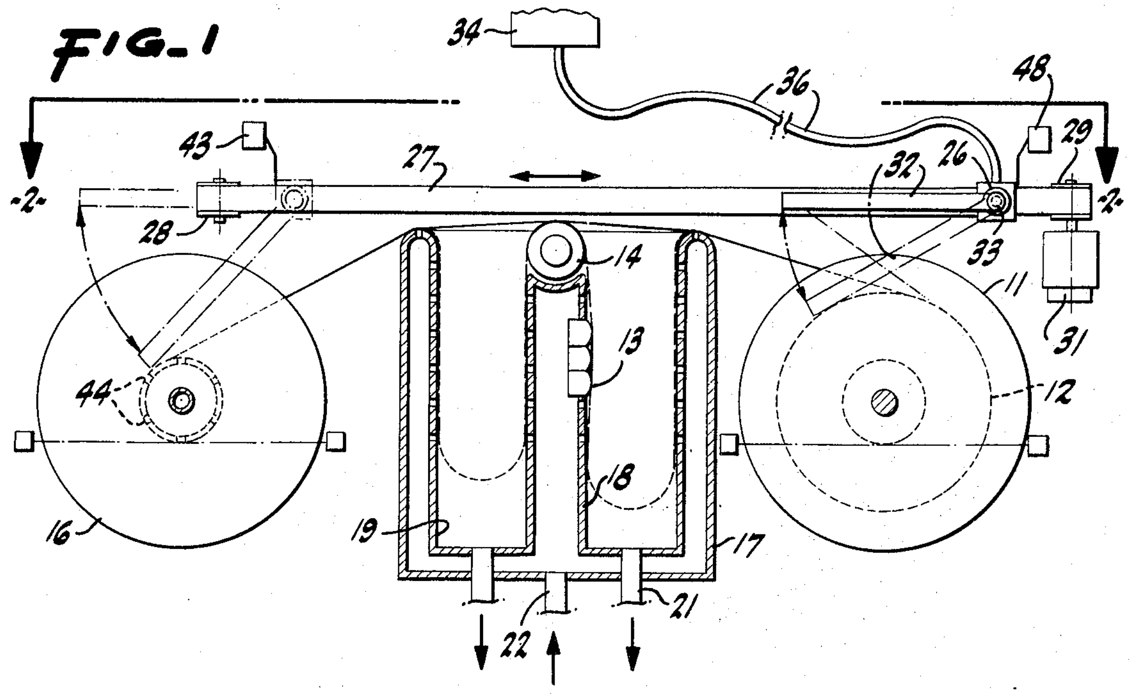
FIG. 1 is a schematic plan view of a recorder/reproducer incorporating an automatic threading apparatus in accordance with the present invention.

Although the invention is applicable to substantially any type of apparatus operating upon tape, it is at least in part hereinafter referenced to magnetic tape devices for convenience. Also, it is known to transport various kinds of tape between numerous types of storage or receipt devices such as bins, reels and the like; however, the following description is primarily referenced to tape reels. Further with reference to tape transport mechanisms only portions thereof which relate to this invention are fully identified. A tape device with which the present invention is employed may include a supply reel 11 having a central hub with top and bottom flanges and upon which is wound magnetic tape 12. The device may also include one or more heads utilized, for example, for recording, playback and erasing, as generally indicated at 13, together with tape drive means such as a capstan 14 and takeup reel 16. Tape is extended from a supply reel across the heads 13 about the capstan 14 and onto the takeup reel so that upon rotation of the reels, tape will be passed over the heads 13 and a variety of different means are normally employed for insuring proper passage of the tape across the heads. The configuration illustrated in FIG. 1 includes three vertically spaced walls 17, 18 and 19 with the heads 13 carried on the central wall 18, and the walls defining vacuum columns therebetween. The capstan 14 is carried at the outer end of the central wall 18 and by drawing a vacuum between the walls, as through connections 21, tape may be drawn over the top of the first wall 17 from the supply reel and thence downwardly into the vacuum column between the walls 17 and 18 so as to pass over the heads 13 and traverse up around the capstans 14 and again down into the second vacuum column between the walls 18 and 19 and thence back over the wall 19 to the takeup reel 16. The equivalent of air bearings may be provided in such a structure by providing small apertures through the walls, as illustrated, and applying a slight air pressure as through a connection 22 to the interior of these apertures so that the tape actually rides upon a layer of air in passing over the walls and ends thereof. Vacuum columns in tape devices are well known.

With regard to the initial placement of tape along a path in the device, it is conventional for this to be accomplished manually by an operator physically gripping the free end of tape upon the supply reel and extending it along the desired path to the takeup reel where the operator attaches it to the hub of the takeup reel. As noted above, various automated systems for tape threading have been developed, however, the majority of these require the provision of a leader, gripping member or the like affixed to the end of the tape. The present invention provides for threading of the tape automatically without the necessity of any particular type of tape end. In accordance with the present invention there is provided a carriage or trolley 26 mounted for movement between the vicinity of the supply reel and the vicinity of the takeup reel. In the embodiment of the present invention illustrated in FIG. 1, this carriage is mounted for movement in a straight line along a track or the like 27, which in this instance is illustrated to be comprised of an endless belt or chain extending about pulleys 28 and 29 with at least one of the pulleys physically engaging the belt or chain to controllably drive it, as by means of a reversible motor 31. A variety of different carriage mounting and movements means are possible and thus herein the mounting is denominated as a track for convenience of nomenclature.

The carriage 26 has a pivotally mounted arm 32 carried, for example, by a rotary solenoid 33 on the carriage and having a sufficient length to be readily pivoted into engagement with tape 12 upon a supply reel 11. The carriage and arm are illustrated in FIG. 1 with the arm pivoted toward the supply reel so that the end of the arm rests upon the tape 12 wound about the reel hub. The carriage 26 is provided for the purpose of gripping or engaging the free end of tape on the supply reel and physically moving this free end to the takeup reel and in the embodiment illustrated in FIGS. 1–3 this gripping is accomplished by means of vacuum acting through one or more openings at the end of the pivot arm 32. This vacuum may be supplied from a manifold 34 by means of a light flexible vacuum hose 36 extending to the carriage and thence through a passage 37 in the arm 32 to an opening or port 38 near the end of the arm. Thus as the arm is pivoted against the tape 12 on the supply reel the suction existing at the port 38 of the arm will draw the free end of the tape against the arm and pivoting of the arm upwardly in FIG. 1 into alignment with the track will then draw the free end of the tape away from the reel. The arm 32 also includes tape-end sensing means as described below.

It is recognized that a variety of different reel drive systems are known in the art. However, in the tape recorder/reproducer of FIGS. 1 and 2 there is shown a supply reel motor 41 adapted to rotate this reel. In accordance with the present invention, provision is made for reversing this motor during the initial portion of automatic threading. Thus, instead of the supply reel initially rotating in a counterclockwise direction in FIG. 1, the reel is initially rotated in a clockwise direction so that the free end of the tape cannot inadvertently depart from the reel and unwind without the free end reaching the suction port at the end of the arm 32. With the tape wound counterclockwise on the supply reel, rotation of the reel on a clockwise direction will not tend to unwind the tape but will pass the free end of the tape across the arm 32 so that the suction thereof will grip the free end.

There is additionally provided by the present invention sensing means for determining engagement of the free end of the tape with the arm and this may, for example, be comprised as a vacuum-sensing port and passage 42 between the end of the arm and the gripping port 38. Thus, as the tape on the supply reel is drawn into engagement with the vacuum port 38 it will also cover the sensing port 42. As the reel rotates, the tape will slide across the end of the arm and the free tape end will then pass the port 42 moving toward the suction port 38. A vacuum switch connected to the sensing port 42 is actuated by opening of the port to reverse the direction of supply reel rotation and to operate solenoid 33 for pivoting the arm 32 away from the supply reel. Time delay means may be incorporated to energize the belt drive motor 31 as soon as the arm 32 is pivoted into position for carriage movement toward the takeup reel.

Figure 3A:
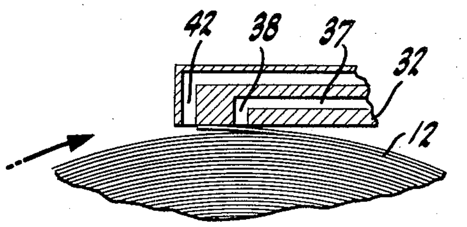
FIG. 3A is a partial sectional view of a pickup arm or carriage illustrating the multiple vacuum openings at an end thereof for both sensing and gripping purposes.

It is to be noted that clockwise rotation of the supply reel is to be stopped just after the free tape end passes the sensor and before it passes the gripping port 38. This position is shown in FIG. 3A. Alternative tape-end sensing means may be employed, as shown, for example, in FIG. 3B. The sensor is shown as a light source 49 and photocell 50 mounted in the underside of the arm 32 near the end thereof with the vacuum port 38 opening ahead and behind the sensor. Thus as the tape end held against the arm by vacuum passes the sensor, light reflected to the photocell by the tape is reduced to generate a signal initiating the above-described events of reversing the direction of reel rotation, etc.

The carriage 26 moves to the left of FIG. 1 into the vicinity of a takeup reel 16 and is stopped at that point by a limit switch 43. This limit switch may also be employed to energize the carriage itself for pivoting the carriage arm 32 toward the takeup reel into the position shown in dashed lines in FIG. 1, whereat this arm rests against the hub of the takeup reel. In accordance with the present invention, the takeup reel is provided at the hub thereof with means for gripping the tape end and in this embodiment these means are shown as apertures 44 connecting to a vacuum line 46. The takeup reel is rotated in a counterclockwise direction by a drive motor 47. It will be seen that with the free end of the tape placed against the rotating hub of the takeup reel, such end will be gripped by suction and wrapped around the hub. Either the vacuum at the takeup reel may be greater than that exerted by the arm of the carriage through the port 38 thereof, or suction through this port 38 may be terminated by turning off the vacuum so as to release the tape. Alternatively, time delay means or a hub sensor may be employed to release the tape from the carriage arm. At any rate, the tape is physically gripped by the takeup reel hub, for example, by the suction existing through the ports therein so that with rotation of the takeup reel the tape is wrapped about the hub and after a few turns the takeup reel vacuum may be terminated inasmuch as the tape will hold itself about the hub. The carriage arm 32 is then rotated back into alignment with the track, as generally indicated in FIG. 1, and the carriage may then either remain in this position or be automatically returned to the right of the track whereat the traverse of the carriage is stopped by a limit switch 48.

The automatic threading apparatus as described above will be seen to initially grip or engage the free end of tape upon a tape supply reel and physically transport this tape into engagement with the hub of a takeup reel whereat the tape is gripped, as by a vacuum, so as to be locked on to the takeup reel with rotation of the latter. All of the foregoing is accomplished automatically by the closing of a threading switch on the device which will serve to initiate the above-described operations. Proper location of tape in the vacuum column of the tape recorder/reproducer itself is conventionally accomplished, as by drawing the requisite vacuum and providing a sufficient slack or extension of tape so that the tape is located somewhat in the manner illustrated by the dashed lines in FIG. 1.

Figure 2:
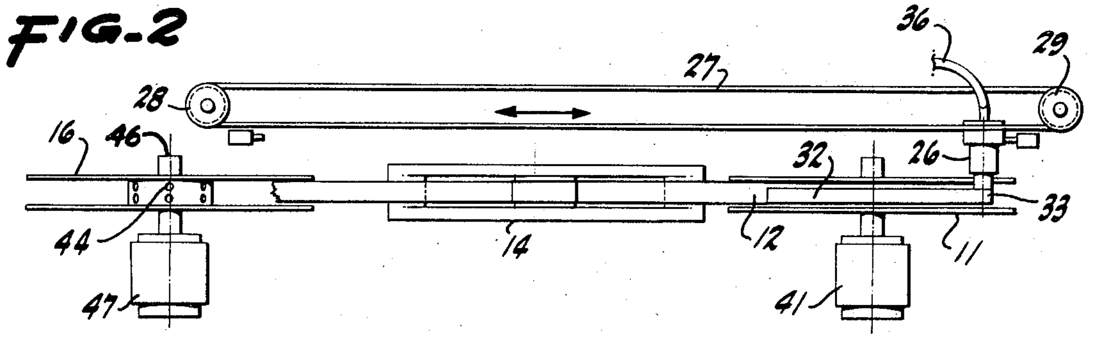
FIG. 2 is an elevational view taken in the plane 2—2 of FIG. 1.
Figure 3B:
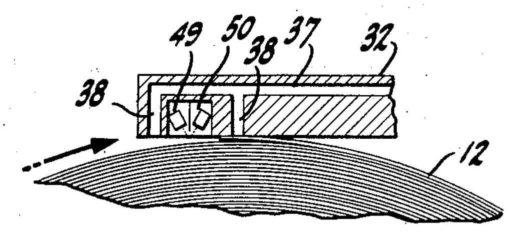
FIG. 3B is a schematic plan illustration of a reproducer/recorder incorporating an alternative embodiment of automatic threading apparatus in accordance with this invention.
Figure 4:
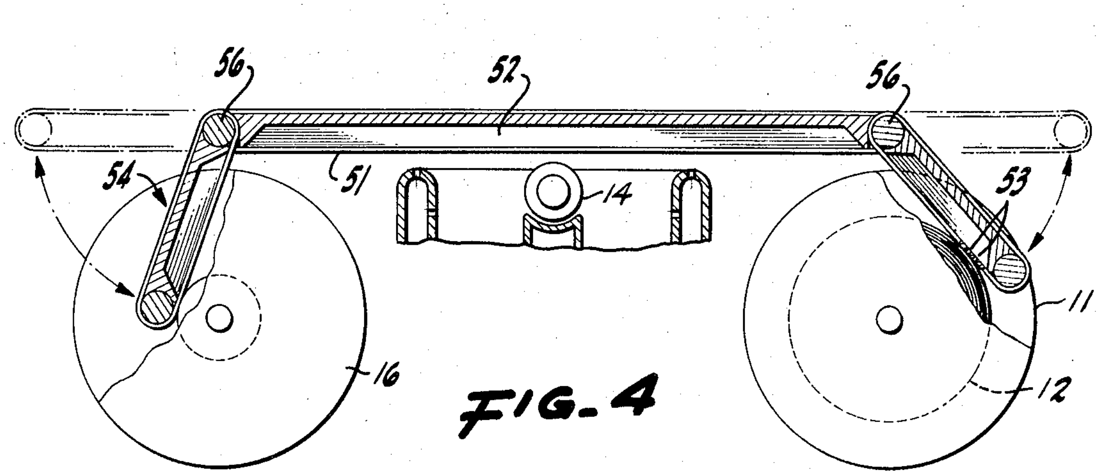
FIG. 4 is a schematic plan illustration of a reproducer/recorder incorporating an alternative embodiment of automatic threading apparatus in accordance with this invention.

As noted above, the present invention admits of a variety of alternatives and certain of these are illustrated in the remaining figures of the drawings and at least briefly described below. In each of the following descriptions substantially the same type of tape recorder/reproducer equipment is assumed unless otherwise stated. Thus in FIG. 4 there is shown supply and takeup reels 11 and 16, respectively, disposed on opposite sides of means including tape heads. The automatic threading apparatus of the present invention, as illustrated in FIG. 4, includes what may be termed a vacuum belt 51 which may actually comprise one or more flexible belts movable about pulleys, rollers or the like with two or more openings therethrough and backed by a vacuum manifold 52. Vacuum openings 53 in the belt are initially pivoted into position to engage and thus grip a free end of magnetic tape 12 wound upon the supply reel 11 which, as described above, is initially rotated in the opposite direction to that required for passage of tape through the device to the takeup reel. At the other end of the tape traverse during threading there is provided a pivotally mounted portion 54 of the threading apparatus pivoted, for example, by a rotary solenoid 56 about which the belt extends so as to move as indicated into proximity with the hub of a takeup reel, such as illustrated in FIGS. 1 and 2 of the drawings. In this embodiment of the present invention there are to be provided somewhat the same control members as described above, such as for example, a vacuum switch connected to an opening in the vacuum belt and operated in the manner described above for the purpose of reversing rotation of the supply reel and also, for example, for releasing tape returned to the supply reel from the takeup reel.

In practice, the belt 51 may be formed as three separate belts with the pivotal end belts, for example, contacting one-half the width of the tape and the center belt contacting the other half of the tape width. Also, for certain applications there may be included a gap between two cooperating belts together threading the tape. Of course with more than one belt there will be provided gripping openings in each belt.

Figure 5:
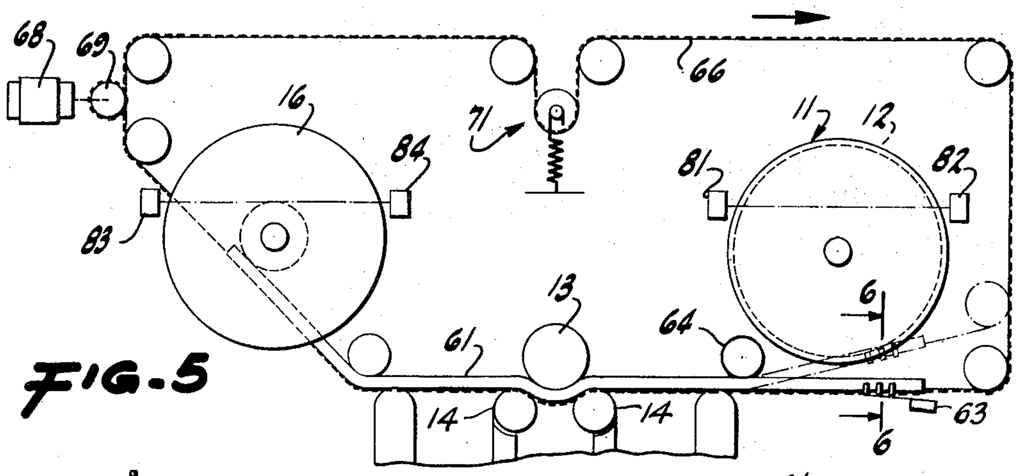
FIG. 5 is a schematic plan illustration of yet another embodiment of the present invention as incorporated in a tape recorder/reproducer.
Figure 6:
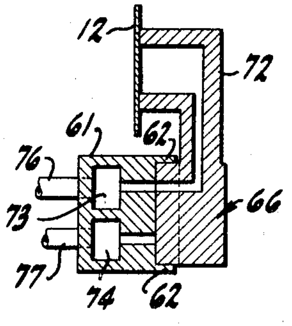
FIG. 6 is a sectional view taken in the plane 6—6 of FIG. 5 and illustrating a vacuum manifold and travelling belt thereon.
Figure 7:
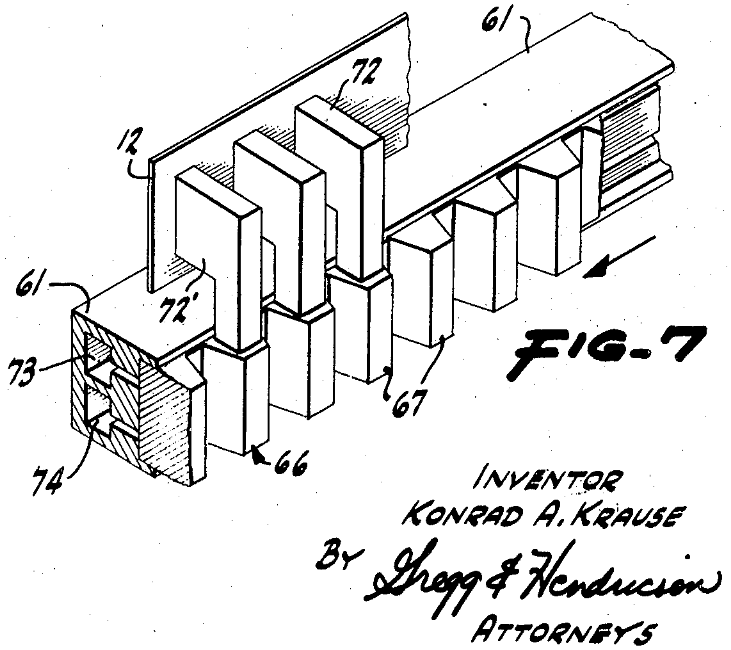
FIG. 7 is a partial perspective view of a portion of the vacuum manifold and engaging belt showing vacuum gripping means engaging the ends of a magnetic tape.

It has been noted above that the track of the present invention may be straight, as illustrated in FIG. 1, may include movable portions, and in addition, may have various curves, turns or the like therein. There is illustrated in FIGS. 5, 6 and 7 an embodiment of the present invention employing what may be termed a curved track. Here again details of the tape recorder/reproducer apparatus are minimized to the extent possible. However, there are shown supply and takeup reels 11 and 16 adapted to be rotated in conventional manner to pass tape 12 across heads 13 of the device. In this embodiment of the present invention there is provided a track 61 which is comprised of a vacuum manifold, such as illustrated in FIG. 6, and having lateral top and bottom projections 62 along one side thereof. This track 61 extends from the vicinity of the supply reel to the vicinity of the takeup reel and is located beneath these reels, as viewed in FIG. 5. A portion of this track 61 in the vicinity of the supply reel 11 is arranged for pivotal motion, as by means of a rotary solenoid 64, so as to swing from a normal position, as indicated in the drawings, to an operative position, as indicated by dashed lines in the drawing. This embodiment of the present invention also incorporates an endless belt 66 fitting between the lateral projections 62 of the track, as shown in FIG. 7, and having a cogged or toothed exterior, as indicated at 67 of FIG. 7. This belt slidably engages the track 61 so as to move therealong under control of a reversible drive motor 68 engaging the toothed exterior of the belt, as by a cog wheel or the like, schematically illustrated at 69. This endless belt 66 may extend about a plurality of pulleys, rollers or the like, to direct and redirect the belt as required to complete a loop thereof such as shown in FIG. 5. Additionally, there may be provided tensioning means 71 to take up slack in the belt as may occur during pivoting of a portion of the track, described below.

With regard to gripping of the free end of tape wound about the supply reel and movement of such end along the track 61 to the takeup reel 16, it is noted that the belt 66 is provided with hollow upward extensions 72 that may be considered as a carriage. The track 61 of this embodiment comprises a vacuum manifold such as illustrated in cross section in FIG. 6 and having, for example, first and second vacuum passages 73 and 74 longitudinally thereof. One of the vacuum passages 73 communicates with gripping extensions 72 and the other passage 74 communicates with a sensor extension 72'. The endless belt 66 is provided at the location of the upward extension 72 with openings extending from the vacuum manifolds of the track through the upward extension 72 to termination at a tape plane. One or more upward extensions 72 are provided for the purpose of gripping the free end of magnetic tape wound about a reel and another upward extension 72' is provided as a vacuum sensor to operate a vacuum switch such as described in connection with FIG. 1.

As noted above, the track 61 is physically located beneath the supply and takeup reels of the device and the upward extensions 72 of the belt moving along the track are dimensioned to thus engage tape upon a supply reel 11 and to move the free end of such tape along a predetermined path, as defined by the track beneath the path, to the hub of a takeup reel 16. In this instance it is to be noted that the takeup reel 16 is formed without a lower flange thereof, so that the upward projection 72 on the endless belt may readily move to the takeup reel hub without any interference with the structure of such reel.

With regard to operation of the embodiment of the invention illustrated in FIGS. 5–7, it is noted that the endless belt 66 at all times extends in intimate contact with the entire grooved length of the track 61. Consequently, vacuum drawn through vacuum lines 76 and 77 on the manifolds 73 and 74 of the track is not exposed to atmosphere except through the upward extension 72 of the belt and then only when such extensions are not physically contacting the magnetic tape 12. In order to initially engage the free end of tape wound about the hub of a supply reel 11, one end of the track is pivoted, as for example by the rotary solenoid 64, to swing the upward extensions 72 of the belt carried by the track into engagement with tape upon this reel. As the reel viewed in FIG. 5 is rotated in a counterclockwise direction, the free end of the tape will be engaged by the upward extension 72 of the belt because of the suction existing on the front faces of these elements and with regard to the sensor element of this group, loss of suction thereat as the tape end passes same will produce a switching signal to reverse rotation of the supply reel and pivot the track back into the position shown in solid lines in FIG. 5. It is to be appreciated that the belt at all times remains in contact with the track inasmuch as the tensioning means 71 insures that belt and track will not separate when the track is pivoted toward the supply reel. The belt is then moved to the left in FIG. 5 along the track 61 by the drive motor 66 through the cogwheel 69 engaging the teeth 67 on the outer surface of the belt, to the point whereat the end of the tape is located in contact with the hub of the takeup reel. This takeup reel 16 may be provided with the same type of vacuum hub as described above but it does not include a bottom flange, inasmuch as the track 61 extends immediately beneath the reel. The projections 72 extend upwardly from the belt on the track to position the tape immediately adjacent and in fact in contact with the hub so that the vacuum thereof will grip the tape end, with rotation of the reel, will wind the tape about the hub. The threading operation is then complete and the projections 72 are moved out of the way by further movement in the same direction and returning to same original position stopped with limit switch 63. The tensioning means 71 noted above is provided for maintaining the belt in tight contact with the track when the right end thereof, as seen in FIG. 5, is pivoted up to the supply reel. It will be seen that this actually shortens the endless belt loop. Of course, this tensioning means may be provided at any desired location in the loop.

It is to be noted that insofar as this embodiment of FIG. 5 is concerned, there is provided at least the equivalent of a carriage physically movable between supply reel and takeup reel which grasps or grips the free end of tape in the supply reel and moves it along a predetermined path to the takeup reel. In this embodiment as well as those described above there may also be provided means for automatic rewinding of tape from the takeup reel to the supply reel after recording or reproduction. Such means may, for example, comprise a first light source 81 transmitting a beam of light or the like along a path substantially tangent to the hub of the supply reel to a photocell or the like 82. This photocell may be employed to control circuitry for reversing the direction of tape travel in order to rewind the tape upon the supply reel before the inner end of the tape leaves the reel hub. A second light source 83 and associated photocell 84 may be similarly disposed with respect to the takeup reel 16 in order to terminate rewinding, if desired. In the instance of the embodiment of FIG. 4, for example, the light source and photocell associated with the takeup reel may also be employed to energize the pivotally mounted portion 54 of the vacuum belt manifold.

Figures 8, 9:
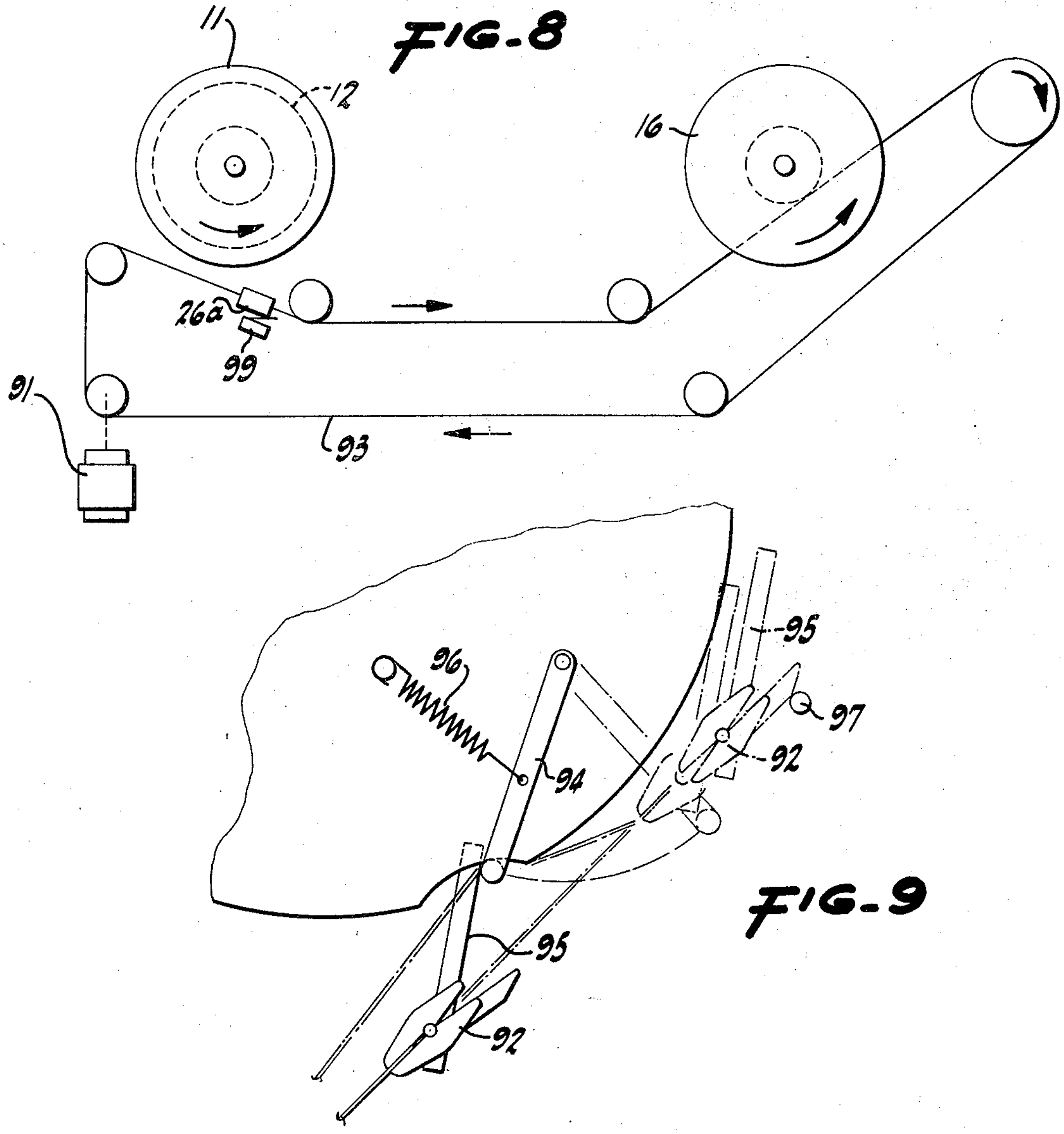
FIG. 8 is a schematic plan illustration of a still further embodiment of the automatic threading apparatus of the present invention as associated with an audio recorder, for example.
FIG. 9 is an enlarged partial view of takeup reel and tape carriage gripping means of FIG. 8 showing tape engagement with the takeup reel hub.

Further with regard to the provision of a physically movable carriage which initially engages the free end of tape upon a supply reel and draws such tape along a predetermined path for attachment to a takeup reel, there is shown in FIG. 8 a mechanical variant of this invention which is advantageous for certain applications, such as, for example, a commercial audio recorder. As illustrated, this particular embodiment is not entirely automatic but instead is semiautomatic to the extent that an operator originally places the free end of tape on the supply reel 11 into engagement with the carriage or the like 26*a*. This carriage is mounted upon an endless chain or belt moving about pulleys or guide means and driven for example by a motor 91. The carriage 26*a* may mechanically grip the tape end as by a tape clamp arrangement 92, such as illustrated in FIG. 9. This gripper 92 may be somewhat similar to a clothespin in construction so that it may be physically opened as by squeezing one end thereof and the tape inserted between the jaws and then closed so as to remain closed by means of an internal spring, for example. The gripper or carriage is firmly affixed to the endless belt 93 and upon actuation of the motor 91 is then moved by the belt from the supply reel to the takeup reel. In this embodiment also, the takeup reel is formed without a bottom flange and the belt passes directly under the periphery of the hub thereof. At this location the tape is released and in this embodiment mechanical means are employed for tape release and tape attachment to the hub of the takeup reel.

Upon actuation of the threading apparatus, as by means of a switch energizing the motor 91, the belt is moved to physically transport the carriage 26*a* with the gripped free end of the tape from the supply reel across the tape heads and he like of the device to the takeup reel. The track or endless belt of the apparatus is physically located below the reels 11 and 16, as noted above, and thus the carriage 26*a* moves to the hub of the takeup reel across the bottom of the reel. The takeup reel had been prepositioned with a mechanical linkage, clutch, detent-solenoid or the like, not shown in the drawing. At this position a projection 95 on the gripping means of the carriage engages a pivot pin 94 on the hub of the takeup reel and pivots this pin outwardly, as indicated in FIG. 9, against the tension of a spring 96. The pivot pin 94 is formed with an L-shape to extend over the top of the carriage and down the opposite side thereof as the carriage moves past the hub. At this point the carriage engages a fixed stop or the like 97 at a lateral projection on the clip 92 so as to open the clip and release the tape therefrom. At this same time the pivot pin 94 has ridden over the clip of the carriage and is forcibly pivoted back to original position by spring tension so as to engage the free tape end and clamp it against a small indentation in the hub. The threading operation is then complete and the carriage is moved out of the way by further movement past the stop 97 and returning to original position where it is stopped with a limit switch 99. The pivot pin 94 could also be opened and closed with a solenoid.

It will be seen that this embodiment of the present invention also, in common with previously described embodiments, incorporates the basic characteristic of a movable carriage or the like controllably travelling between a supply reel and takeup reel while gripping the free end of tape from the supply reel and at the takeup reel releasing the tape end which is then gripped by the takeup reel at the hub thereof to complete the threading operation.

Figure 10:
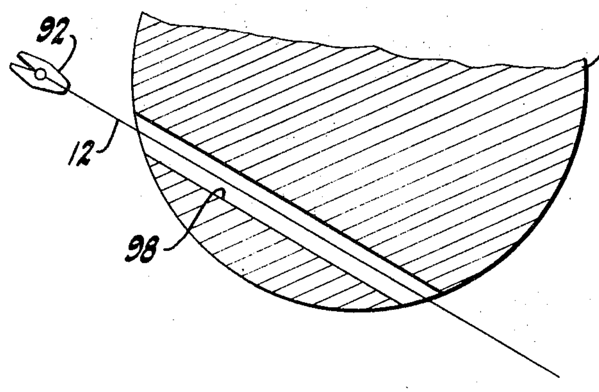
FIG. 10 is a transverse sectional view of an alternative takeup reel hub structure as may be employed in this invention.

Various alternative pneumatical, mechanical or electromechanical gripping means for the carriage are possible and also a variety of tape gripping means on the hub of the takeup reel are practical. Also as shown in FIG. 10, the gripping means of the carriage may pass through a slot 98 in the hub of the takeup reel so that with rotation of this reel the tape is wound about the hub. Similarly, the hub may, for example, be formed with posts thereabout with the tape threaded therebetween and thus gripped by hub rotation. Even in the instance of vacuum gripping by the hub, such vacuum may be employed along a slot in the hub.

Although there have been described above a number of embodiments of the present invention, it is to be appreciated that other alternatives are possible and numerous variations in individual elements and relationships therebetween fall within the proper scope of the present invention. It is thus not intended to limit the invention by the details of illustration or precise terms of description but rather to present the disclosure as a general identification of the invention defined in the following claims.

I claim:

1. Tape threading apparatus comprising:

a carriage having means for gripping a free end of tape on a supply reel, track means comprising an endless belt extending at least from the vicinity of a tape supply reel to the vicinity of a tape takeup reel along a normal path of tape traverse between said reels, drive means moving said carriage by said track means about guide means between said reels, means controllably pivoting at least a portion of said carriage radially of said reels for engaging and releasing tape at said reels, and means on said takeup reel gripping the tape end and withdrawing same from said carriage gripping means for attaching the tape end to said takeup reel.

2. The apparatus of claim 1 further defined by said carriage including a pivotally mounted arm controllably movable radially of said reels with said arm having at least one vacuum-opening adjacent the outer end thereof adapted to engage tape wound about said supply reel and to thus grip the tape and move the free end thereof from the supply reel, and sensing means disposed at the end of said arm for sensing the passage of the free end of the tape thereover and producing a signal to retain such free end at said arm for movement from said supply reel.

3. The apparatus of claim 2 further defined by said takeup reel having vacuum openings through the hub thereof for gripping the end of tape placed thereon by said carriage arm and wrapping the tape about the reel.

4. The apparatus of claim 2 further defined by limit switches disposed adjacent said track in position for actuation by said carriage to stop track movement in positions to pivot said carriage arm radially of said reels.

5. Tape-threading means for a tape recorder and reproducer having a supply reel position, a takeup reel position, a tape path between said reel positions and means for rotating reels located at said positions, comprising:

a tape transport carriage having at least one vacuum opening therein for suction gripping of a free tape end at a supply reel, drive means physically moving said carriage from said supply reel position to said takeup reel position along said tape path and moving said carriage radially of tape reels at said positions, and gripping means including the hub of a takeup reel for gripping a tape end delivered thereto by said carriage and withdrawing such end from said carriage to complete tape threading.

6. Tape threading means as set forth in claim 5 further defined by said tape transport carriage comprising at least one flexible belt extending about guide means, and means pivoting portions of said belt radially of said reels.

7. Tape-threading means as set forth in claim 5 further defined by said takeup reel having no more than one flange extending from a hub thereof, and said tape transport carriage including an endless belt extending about guide means directing tape gripping means of the carriage against the hub of said takeup reel.

8. A tape threading system for a tape recorder/reproducer that is adapted to mount a tape supply reel and a tape takeup reel and to rotate same for passing a tape along a predetermined path between said tape reels comprising:

a carriage having a vacuum connection and at least one suction opening therein for gripping a free end of tape on a supply reel, track means extending between locations of said supply reel and takeup reel, means controllably moving said carriage between said reel locations, said carriage including controllable pivot means for moving the suction opening radially of said reels, and vacuum gripping means including openings in said takeup reel for gripping a tape end positioned thereat by said carriage and securing the tape end to the takeup reel.

9. Automatic threading apparatus for a tape transport device comprising:

a carriage movable between locations of a tape supply reel and a tape takeup reel in the transport device, gripping means on said carriage movable into engagement with tape wound about said supply reel, means rotating said supply reel in a direction to wind tape thereon during an initial stage of threading whereby a free end of tape wound on said supply reel passes said gripping means, sensing means on said carriage producing a signal upon passage of a free tape end thereover before tape end passage over said gripping means for reversing direction of supply reel rotation, and means engaging a free tape end at said tape takeup reel as delivered by said carriage.

10. In vacuum-threading apparatus for a tape recorder/reproducer having supply and takeup reels and vacuum means movable into engagement with a roll of tape wound upon the supply reel, the improvement comprising:

means controllably rotating said supply reel in a rewind direction whereby the free end of tape thereon moves toward the vacuum means engaging the tape roll periphery, sensing means engaging said tape roll periphery ahead of said vacuum means as the supply reel rotates in the rewind direction and producing a signal-reversing direction of supply reel rotation before the free tape end passes the vacuum means and moving the vacuum means away from the reel with the free tape end gripped thereby.

11. A tape-threading system for tape transport means having a tape supply means and a tape takeup means with a tape path of any configuration therebetween comprising carriage means including a plurality of vacuum-gripping means movable into engagement with tape at said supply means for gripping a free tape end thereat, drive means moving said carriage means between said supply means and said takeup means for drawing tape along said tape path therebetween, said vacuum gripping means being separately movable and disposed in proximity with each other to transfer said tape end therebetween in movement between said supply reel means and said takeup reel means and tape-receiving means at said takeup reel means accepting said tape end delivered thereto by said carriage means.

12. The system of claim 11 further defined by said supply reel means including a rotary mounted hub about which tape is wound, said carriage means including sensing means adjacent vacuum gripping means movable into engagement with the periphery of tape wound on said hub, and means rotating said supply reel in a rewind direction until said sensing means sensing the free tape end thereon and then rotating said supply reel in an unwind direction whereby said tape end is located and removed from said supply reel.

* * * * *